Jan. 8, 1946.  N. M. MARSILIUS  2,392,752
MILLING MACHINE
Filed July 21, 1942  4 Sheets-Sheet 1

INVENTOR
Newman M. Marsilius
BY John Hanrahan
ATTORNEY

Jan. 8, 1946.   N. M. MARSILIUS   2,392,752
MILLING MACHINE
Filed July 21, 1942    4 Sheets-Sheet 3

INVENTOR
Newman M. Marsilius
BY
John H. Hanrahan
ATTORNEY

INVENTOR
Newman M. Marsilius

Patented Jan. 8, 1946

2,392,752

UNITED STATES PATENT OFFICE 2,392,752

MILLING MACHINE

Newman M. Marsilius, Bridgeport, Conn.

Application July 21, 1942, Serial No. 451,692

14 Claims. (Cl. 90—15.1)

This invention relates to new and useful improvements in machine tools and has particular relation to a milling machine especially adapted for the cutting of spiral flutes on spot facing and other tools having spiral flutes although the present machine may be used for the cutting of both tapered and constant depth grooves or teeth in other work whether straight, tapered or contoured.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 6 is a detail view showing a variation.

Figure 1:
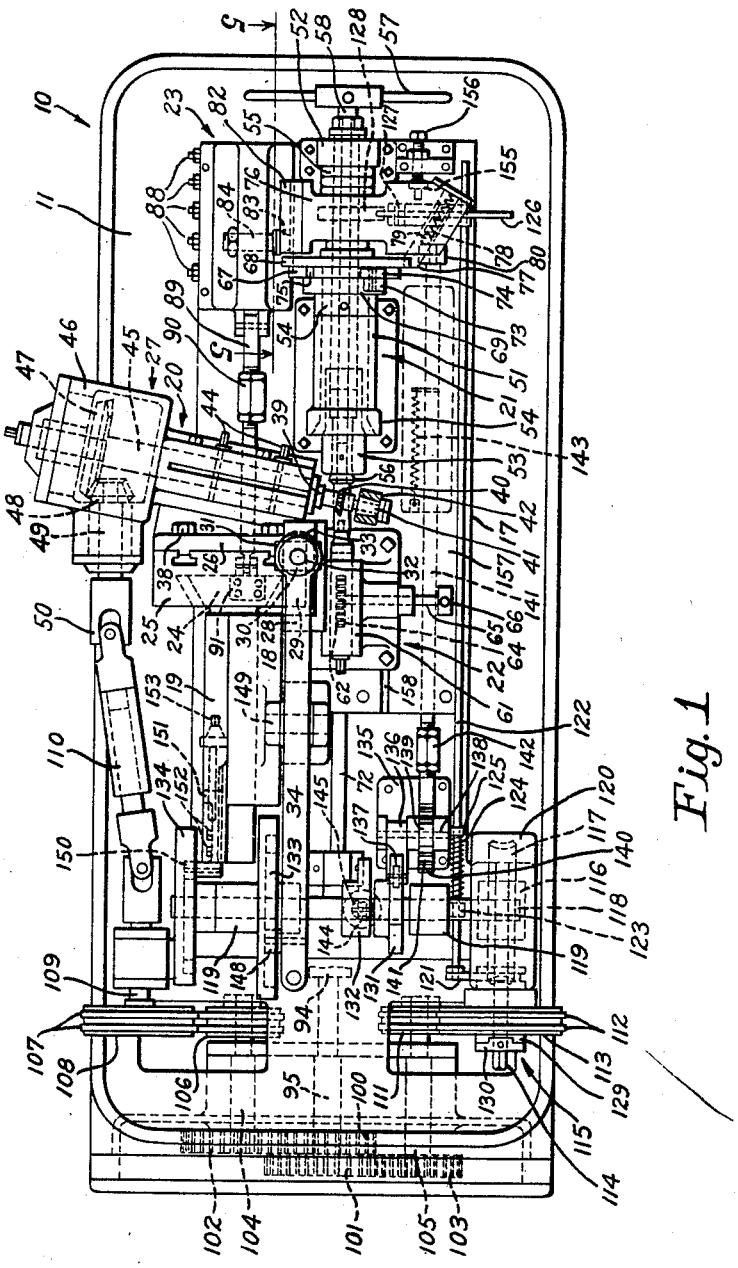
Fig. 1 is a top plan view of the machine of the present invention.

Referring in detail to the drawings the machine of the invention includes a hollow base 10 having an upper wall 11 inclined to drain into a sump 12 access to which may be had through a clean-out door 13. Above sump 12 a chamber 14 having a screen 15 in its bottom wall whereby to substantially separate the chips and the like from the coolant as it drains into the sump. Access to chamber 14, for the purpose of removing accumulated chips and the like therefrom, is through an opening 16 in the front wall of the base 10.

Mounted on the base 10 is a bed 17 having integral therewith or fixed thereon a support 18 in which is mounted, for horizontal movements, a slide 19 at its forward end carrying a tool head generally designated 20. On the forward portion of bed 17 is a plate 157 mounting a work holder 21, a live center device 22 for assisting in supporting the work, and a slide 23 which cooperates with the work holder as will fully appear.

Support 18 has a dove-tailed groove opening through one side and each end thereof and slide 19 is mounted in and movable through said groove. At its forward end slide 19 carries a head 24 dove-tailed in plan and mounting, for vertical movement, a tool head 20. The latter includes a block 25 mounted on head 24 and in turn having mounted thereon, for vertical adjustments, a plate 26 having a cutter holder, driving means, etc., 27 bolted or otherwise secured thereto.

Rigid with the block 25 is a guide means 28 having a rectangular slot 29 the upper and lower sides of which are defined by templates 29a and 29b between which is located a block 30 filling the slot vertically between said templates but adapted to permit of relative horizontal movement of the guide. Block 30 is carried by the lower bifurcated portion 31 of a bolt 32 passing upwardly through the split forward end portion of a cut lever 34. The split portion 33 is drawn against the bolt 32 on tightening of bolts 35 whereby bolt 32 is secured in the desired position of vertical adjustment. On loosening of bolts 35 the bolt 32 may be adjusted vertically and fine adjustments are made by the micrometer screw relation of said bolt with a nut 36 having a graduated dial 37 associated therewith.

On loosening of nuts 38 the plate 26 and the cutter holder means 27 may be adjusted vertically relative to the block 25. This cutter holder means includes a chuck 39 receiving the shank of a milling cutter 40 the outer end of which is disposed in a bearing 41 in a block 42 supported by an arbor shaft 43 clamped in the desired position on tightening of the nuts and bolts 44. Cutter 40 is thus firmly supported and is disposed between the work holder 21 and the live center device 22.

Figure 2:
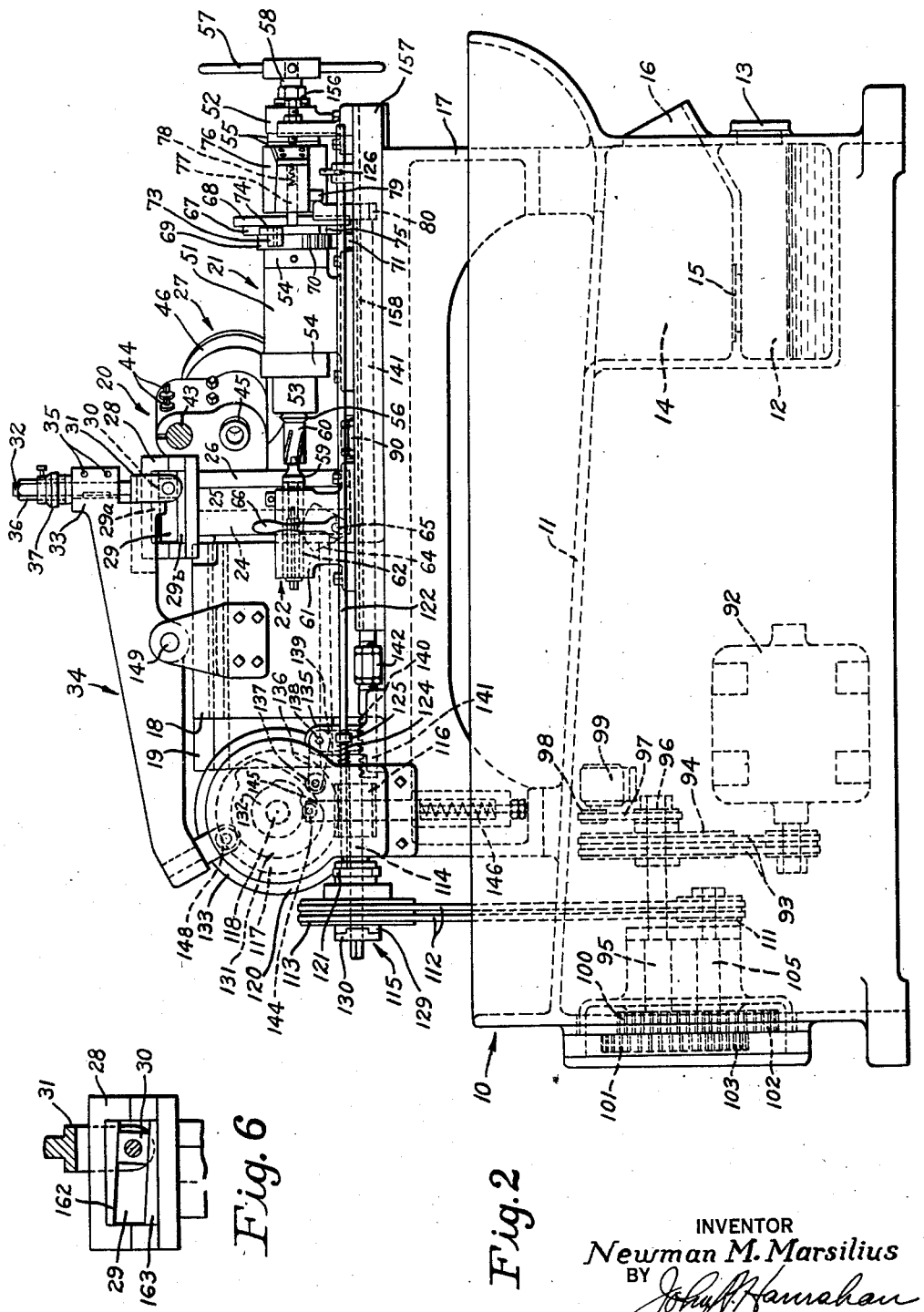
Fig. 2 is a side elevational view of said machine.

Chuck 39 is rotated by a shaft 45 mounted in a suitable bearing (not shown) in a housing 46. Within said housing the shaft has secured thereon a bevelled gear 47 meshing with and driven by a bevelled gear 48 on a shaft 49 in turn driven through a universal joint 50. Chuck 39 is driven or rotated in a clockwise direction as viewed in Fig. 2.

The work holder 21 includes spaced bearings 51 and 52 and a sleeve 53 turnable in said bearings and held against longitudinal movement as by collars 54 and spacers 55. A work clamping collet 56 in the forward end of the holder is adapted to be opened and closed manually through operation of a hand wheel or device 57 operating a shaft 58. When work 60 is being mounted in the collet chuck 56 the live center 59 of the device 22 is retracted and thereafter such center is advanced into a center opening in the free end of the work.

Centering and supporting element 59 comprises a bar-like device rotatably mounted in a support 61 and provided with rack teeth 62 meshing with teeth on a segment 64 mounted on a short stem 65 fixed to a handle or operating lever 66. Clearly through movement of this lever to the left and to the right (when viewed in Fig. 2) the center element 59 will be retracted and then advanced.

Fixed on the sleeve 53 is an indexing disc 67 and a locking disc 68 while turnable on said sleeve is a disc-like element 69 on its lower side provided with teeth 70 meshing with the teeth of a segment 71. That segment is fixed on the forward end of a shaft 72 extending from the rear to the front of the machine bed. Discs 67 and 68 are movable as a unit with the sleeve 53. Element 69 has an arm or radial extension 73 to the outer portion of which is pivoted a pawl 74 for imparting indexing movements to the disc 67 and thus to the work holder and work.

Figure 4:
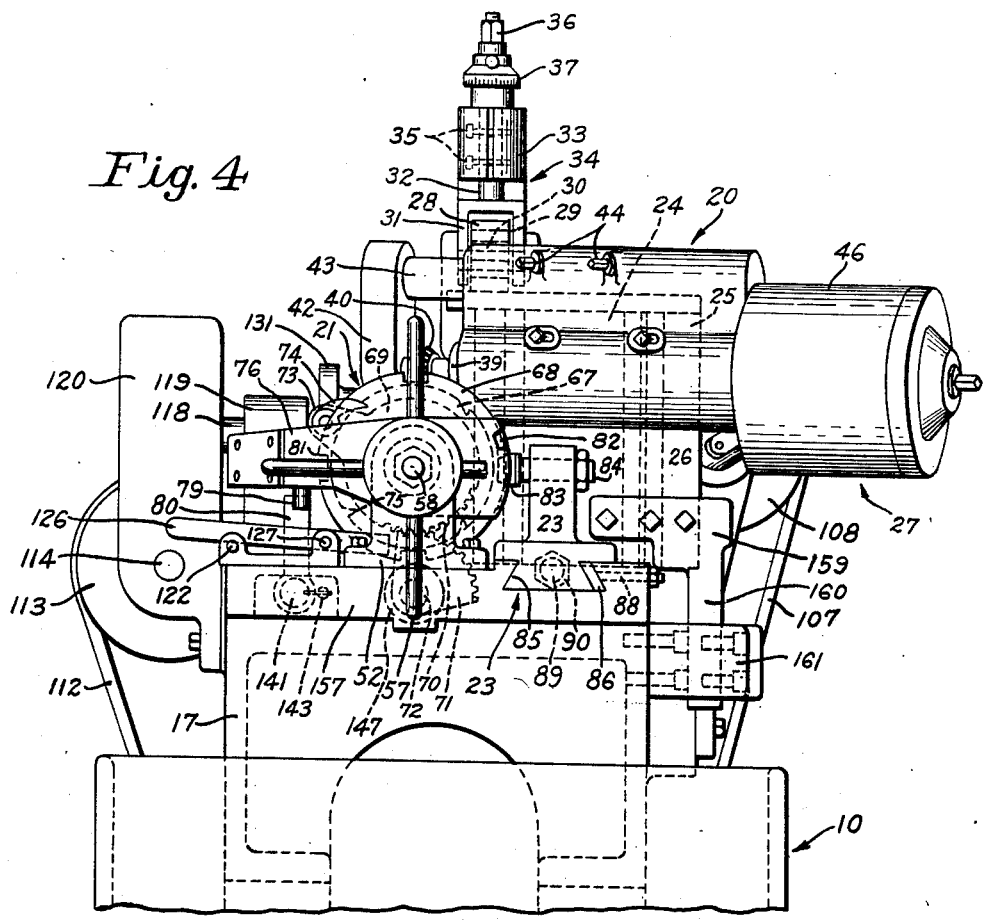
Fig. 4 is a front elevational view of the upper portion of the machine on a larger scale.
Figure 5:
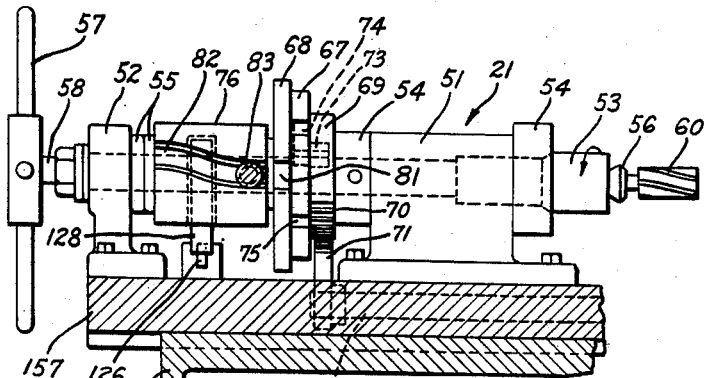
Fig. 5 is a detail sectional view taken as along the plane of the line 5—5 of Fig. 1 and on a larger scale.

On turning movement of the shaft 72 in one direction segment 71 operates to rotate the element 69 in one direction to carry pawl 74 clockwise as viewed in Fig. 4. During this movement the pawl catches in one of the notches or teeth 75 in disc 67 so that the latter and the various turnable parts of the work holder are moved through a predetermined arc. Clearly the spacing of the teeth in disc 67 and the movement imparted to shaft 72 will determine the indexing movement imparted to the work holder. Following the forward indexing movement the shaft 72 is reversed (as will be described) and the element 69 is returned to normal position, the pawl 74 simply riding on the periphery of disc 67 during this return movement.

Mounted for turning movement on sleeve 53 is an arm 76 and the latter at one side of the sleeve carries a latch bolt 77 constantly urged by a coil spring 78 into a position with its outer end engaging the index locking disc 68. Depending from the lower side of bolt 77 is a pin 79 adapted to be engaged at the proper times by a lug 80 which then operates to force the bolt inwardly against the tendency of spring 78. During a cutting operation this bolt 77 is engaged in one of the notches 81 in the locking disc 68 and at the end of such operation the bolt it withdrawn from said notch, the device indexed and then the bolt enters the next notch of the disc 68 locking the parts to the arm 76.

In its rear edge arm 76 carries a cam plate provided with a spiral cam slot or groove 82 in which operates a roller 83 carried on a stud 84 rigid with the slide 23. Said slide is mounted in a dove-tailed groove 85 in plate 157 (see Fig. 4) and a gib 86 in said groove is adjustable to compensate for wear. Screws 88 are provided for the making of such adjustments. Attached to the rear end of slide 23 is a rod 89 including a turnbuckle 90 or other adjusting means. At its rear end rod 89 is attached to a plate 91 bolted or otherwise secured to the lower end of head 24. Thus the slide 23 will move forwardly and rearwardly with the slide 19.

Figure 3:
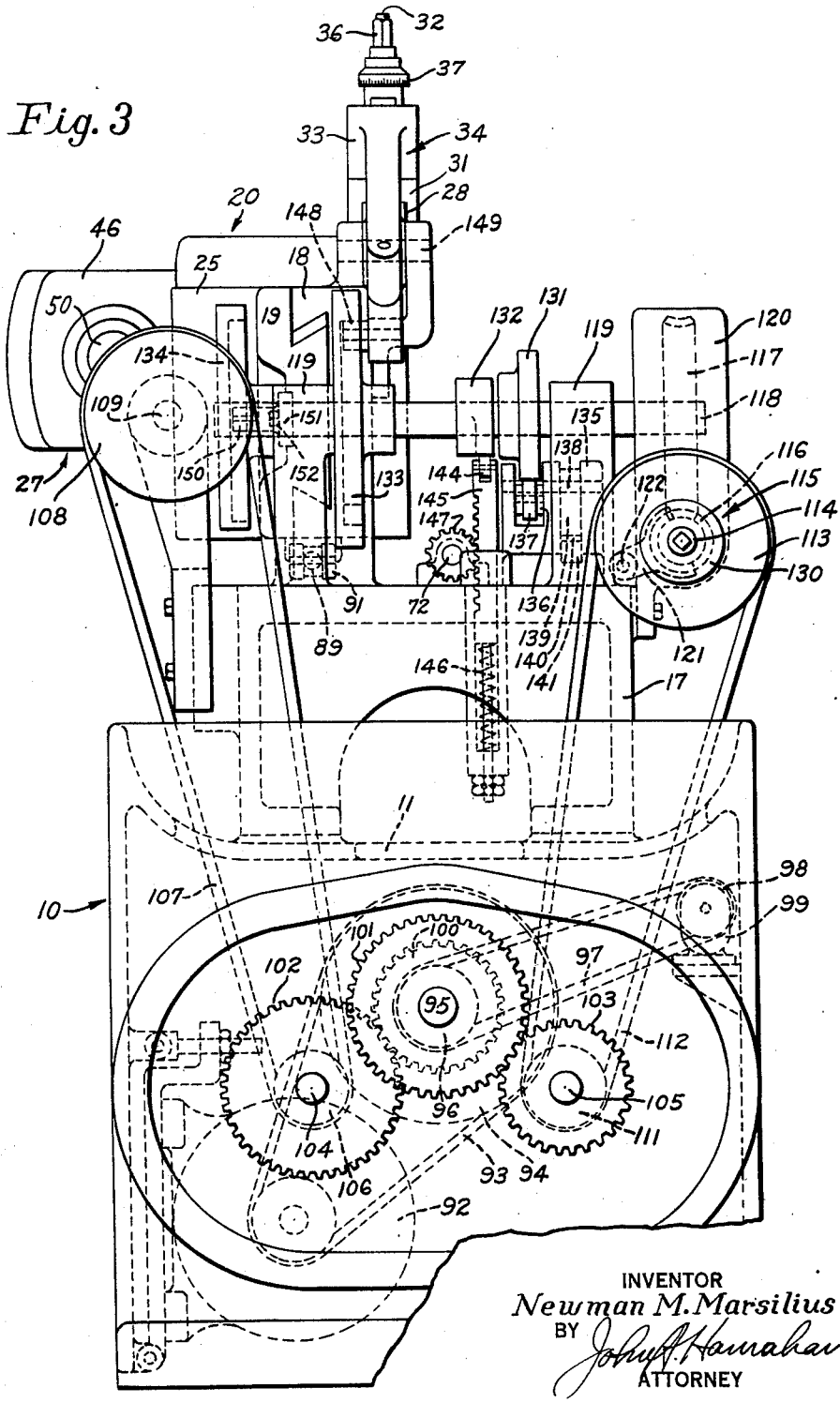
Fig. 3 is a rear elevational view thereof showing the driving arrangement.

A motor 92 mounted in the base 10 provides the power for operating the various means described. This motor (see Figs. 2 and 3) through a belt 93 drives a pulley 94 on a shaft 95. From a pulley 96 on said shaft a belt 97 drives a pulley 98 on the shaft of a pump 99 whereby the latter is operated to supply coolant to the cutting tool as will be understood, the piping for the coolant not being shown. On shaft 95 are gears 100 and 101 driving, respectively, gears 102 and 103 on shafts 104 and 105 respectively.

Fixed to shaft 104 is a pulley 106 which through a belt 107 drives a pulley 108 on a short shaft 109 coupled with a flexible, extensible driving shaft 110 at its forward end connected with and driving the short shaft 49 mounting the bevelled gear 48. On shaft 105 is fixed a pulley 111 which through a belt 112 drives a pulley 113 mounted on a shaft 114 and coupled in driving relation therewith through a clutch means 115. Fixed on shaft 114 is a worm 116 meshing with a worm gear 117 fixed on a cam shaft 118 extending transversely of the bed 17 at the rear end thereof and rotatably mounted in bearings 119 supported by said bed. A suitable casing 120 encloses the worm and worm gear.

Clutch 115 is controlled by a yoke 121 to which is connected an operating rod 122 extending forwardly over the bed 17 to a point adjacent the front end of the machine. Rod 122 passes through guides 125 on the bed and a coil spring 124 about a portion of the rod bears at its respective ends against one of said guides and a collar 123 on the rod. The tendency of this spring is to shift the rod in a direction to move the yoke 121 to a position opening or disconnecting the clutch. Near its forward end the rod 122 is provided with a notch in its upper side and when the clutch 115 is coupled to have the pulley 113 drive the worm 116 a latch 126, pivoted at 127, is entering said notch and holding the rod against the tendency of spring 124.

The machine of the invention operates through a definite cycle and at the end of such cycle a trip cam 128 on sleeve 53 strikes the upper side of the inner end portion of latch 126 and rocks the latter on its pivot 127 lifting its outer portion from the notch in the rod 122. Thereupon the spring 124 functions to shift the rod and disconnect the clutch 115 bringing the machine to a stop. Thus it will be seen that the drive of the cam shaft 118 is stopped at the end of each complete cycle of the machines operation. Uncoupling of the clutch involves the movement of pulley 113 to shift the pulley carried clutch element 129 from the shaft carried clutch element 130.

Mounted on the shaft 118 are four cams designated 131, 132, 133 and 134 respectively. Of these, cams 131 and 132 are contact cams while cams 133 and 134 are path cams. A bracket 135 on bed 17 mounts a lever 136 carrying a roller 137 riding on the cam 131 and this lever is fixed to a short shaft 138 to which is also fixed a lever 139 having teeth at its lower end meshing with teeth 140 on a portion of a rod 141 extending toward the forward end of the machine and there carrying the lug 80 above mentioned. Preferably a turnbuckle 142 is incorporated in the rod 141.

A coil spring 143 is connected with rod 141 and anchored to bed 17 and tends to maintain the rod in a rearward position and to return it to such position and to maintain roller 137 in contact with cam 131. That is, spring 143 returns the parts to their normal positions when the high part of cam 131 recedes from the roller and serves to keep the latter in contact with the cam.

Cam 132 operates against a roller 144 on the upper end of a rack 145 the latter being constantly urged to its upper position and maintained with its roller 144 against the cam 132 by a coil spring 146. Rack 145 meshes with a gear 147 on the shaft 72 which, as above described, at its forward end carries the segment 71 meshing with the teeth of the element 69. At the end of an indexing movement as the cam 132 recedes and spring 146 raises rack 145 shaft 72 is turned in the opposite direction returning segment 71, element 69 and pawl 74 to their normal positions.

Located in the path of cam 133 is a roller 148 carried on the rear end portion of the cutter lever 34. This lever is pivotally mounted intermediate its ends on the support 18 as at 149. With this construction it will be understood that as the rear end of the lever 34 is raised and lowered by the cam 133 the forward end portion of said lever will be lowered and raised. Since such forward end is attached to the block 25 by the guide 28 and the block 30 it will be clear that the cam 133 serves to raise and lower the tool head 20 and such movement is in timed relation to movements of the other parts of the machine as will appear.

Disposed in the path of cam 134 is a roller 150 carried by a block 151 adjustably mounted on slide 19. The block 151 is secured to the slide by bolts 152 and on loosening of these bolts and manipulation of a micrometer adjusting screw 153 the relation of the roller 150 to the slide may be varied whereby to vary the stroke given the slide by the cam. It will be understood that as the cam 134 revolves with the shaft 118 the roller 150 will be moved forwardly and rearwardly of the machine and that the identical movements will be imparted to the slide 19 and the tool head 20 carried thereby. Thus the tool head is moved forwardly and rearwardly toward and from the work holder. Slide 23 being connected with head 24 by the rod 89 the said slide will be moved back and forth with slide 19.

The rear end of shaft 114 is squared or the like at 114 to receive a suitable tool by means of which the machine may be manually turned through its operating cycle. This is an advantage when setting the machine up for a new operation. A hardened wear plate 155 on the arm 76 is disposed to be engaged by an adjustable screw 156 (see Fig. 1) whereby the work holder 21 is held against any loose movement and the arm 76 is held with a wedge-like action by said screw and the roller 83 in the spiral cam groove 82.

Work holder 21 and live center device 22 are both bolted or otherwise mounted on the plate 157 which is adjustable longitudinally of the bed 17. In addition with its bolts in a groove 158 in said plate 157 the live center device may be adjusted toward or from the work holder as the length of the work at hand may require. It is to be understood that these adjustments as well as the other adjustments provided for in the construction described are for use when setting the machine up for a piece of work and that thereafter, until the work is changed, there is no need for the making of adjustments of the parts.

A bracket device 159 is bolted or otherwise secured to the tool head (see Fig. 4) and includes a leg-like portion 160 passing through a slot in a guide means 161 fastened to the bed 17. This construction provides means guiding the heavy tool head in its vertical movements and to the end indicated the leg 160 and the guide 161 cooperate.

At the beginning of a cycle of operation of the machine the tool head 20 is retracted and a piece of work 60 has been placed in the machine and is gripped by the chuck 56 and is also supported by the live center device 59. The clutch 115 is uncoupled. Now the operator shifts the rod 122 against the tendency of spring 124 moving the yoke 121 and connecting the clutch elements. Thus the pulley 113 is connected to drive shaft 114 and worm 116, driving the worm gear 117 and the cam shaft 118.

Rod 141 including its toothed portion 140 and lug 80 are retracted so that the latter is spaced from the pin 79 and the bolt 77 is engaged in one of the notches 81 of the disc 68. If the tool head 20 was not lowered at the end of the last cycle of operation the initial function of the cam 133 is to rock the lever 34 to lower the tool head. Then cam 134 functions to move the slide 19 and thus the tool head 20 and all parts thereof forwardly to bring the cutter 40 into engagement with the work 60.

As the tool head moves forwardly the slide 23 is moved forwardly by the rod 89. Stud 84 moving forwardly with the slide 23 and operating in the cam groove 82 imparts a rocking or turning movement to the arm 76. The right hand end of said arm (as viewed in Fig. 4) is depressed and the arm being latched to the work holder by the bolt 77 and disc 68 the entire holder is given the rocking or turning movement as determined by the profile of groove 82 and the length of movement imparted to the stud 84.

During the time that the arm 76 and thus the work 60 is being given the turning movement described the tool 40 is in engagement with and advancing along the work so that the tool cuts a spiral path or flute in the work. The pitch of this path is determined by the shape of groove 82 and the rate and amount of movement of the parts, etc. It is noted that as the slide 23 is moved by the tool head 20 the movements of the work in the manner described are synchronized with movements of the tool 40.

When the tool reaches the forward end of its cutting movement the cam 133 acts to rock the lever 34 in a manner to raise the tool head 20 and carry the tool 40 out of the cut. As the tool is raised free of the work the cam 134 acts to draw the slide 19 and the tool head rearwardly moving the tool clear of the work. The movement of the tool may continue until the tool is lowered into the plane of the work or the lowering of the tool may be delayed and be part of the first movement in a new operation.

Immediately the tool is free of the work the cam 131 operates rod 141 (as has been explained) and the lug 80 is moved forwardly and engages the pin 79 carried by latch bolt 77 and forces the latter rearwardly to clear the locking disc 68. Now cam 132 depresses rack 145 causing turning of shaft 72 (as has been set forth) whereby to have segment 71 impart an indexing movement to element 69 and through the pawl to the work holder 21. While the indexing movement is taking place the lug 80 is spaced from pin 79 and the bolt 77 therefore rides against the disc 68. Therefore at the end of an indexing movement of disc 67 the bolt 77 enters the next notch in the disc 68 and locks the parts together ready for the next cycle of operation.

The machine may be set up to cut the desired number of spiral flutes in the tool or work 60. When the collet 56 (and thus the work) has been turned through a complete revolution the trip cam 128 engages the latch lever 126 and rocks it on its pivot 127 to release the rod 122. Then the coil spring 124 shifts the rod and the yoke 121 moving the pulley 113 slightly and disconnecting the elements of the clutch 115 bringing the mechanism to a stop. Now the operator removes the finished work.

This involves the operating of the hand device 57 to loosen collet 56 and then retracting the live center device 59 through manipulation of lever or handle 66. A new piece of work is placed in the machine and the clutch 115 coupled and latched in that position and the machine automatically goes through another complete cycle of operation. It will be understood that the clutch 115 has no control of the means rotating the tool 40 and that the same continues to rotate when the motor 92 is operating.

By changing the cam plate having the spiral groove 82 and providing cam plates having different cam grooves therein various spirals may be cut with the present machine. It will be clear that as the head 24 (and the tool head 20) is retracted at the end of a cut the arm 76 will be rocked back to normal position owing to the reverse movement of the roller in the groove 82.

This movement of the arm may be independent of the work holder since at this time the latch 77 is retracted and indexing of the work may be progressing. The tool or cutter 40 being rotated in a clock-wise direction as above mentioned the cutting action is from the tool holder 21 toward the live center device 22. That is, a climb-cut—the action is as though the cutter is climbing onto the work—is obtained. The thrust of the cut is against the device 22.

Templates 29a and 29b being flat serve merely as wear plates. However, for certain work these templates may be removed and replaced with other shapes. Thus in Fig. 6 tapered templates 162 and 163 have been substituted in guide 28. With this arrangement cam 133 functions to lower the cutter to the work. Thereafter cam 134 imparts forward movement to the cutter while cam 133 maintains the block 30 and the cutter at a predetermined level. Therefore as the cam 134 moves the head 20 forwardly the tapered upper side of template 163 riding under the block 30 will be forced downwardly and the head 20 will be moved downwardly at a rate depending on the inclination of the template.

Thus the cutter will be moved deeper into the work and make a tapered cut if the work is horizontal and of constant diameter or will cut a flute of constant depth if the work is tapered downwardly at a corresponding angle from the head 20. Other forms of templates may be substituted for 162 and 163. For example, templates tapered in reverse order from that shown may be used to make a constant depth cut in work increasing in diameter from the cutter, as in the case of a tapered reamer, or for the making of tapered cuts decreasing in depth from the start of the cut.

With other forms of templates V-shaped and inverted V-shaped as well as other shapes of cuts may be made. By a combination of the proper form of templates and proper shape of cam 133 grooves or slots of the desired depth, as a constant or varying depth, may be cut in spheres or other curved or contour shapes. When the grooves or flutes being cut are straight the slide 23 and arm 76 may be omitted from the machine or may be disconnected and left on the machine to be connected for future use.

When cutting shapes which are angular the cutter is controlled only by the cams 133 and 134 if the angles are substantial. Where a slight incline is being cut—as below 10°— the inclined movement of the cutter may be controlled by the templates 29a and 29b as the forward movement is imparted to the slide by cam 134. In cutting on a curve the combined action of cams 133 and 134 causes the cutter to follow the curve as closely as possible with a series of straight lines back and forth across the curve. Then the templates 29a and 29b provide between them a path of the exact curve to be cut and compensate for the inexact movements produced by the action of the cams.

Having thus set forth the nature of my invention, what I claim is:

1. In a milling machine, a bed, a work holder on said bed, a slide, means mounting said slide on the bed for movements toward and from the work holder, a tool holder on said slide, a tool in said holder, means for rotating said tool, means for moving the slide forwardly and rearwardly to carry the tool into and out of engagement with work in said holder, means for indexing the work holder in timed relation with movements of the slide, cam means associated with the work holder and having a spiral cam slot, means for latching said cam means to the work holder, means movable with said slide and operating in said slot to impart a turning movement to the work holder and thereby the work while the tool is moving forwardly in engagement with the work to have the tool cut a spiral path in the work, and means to then unlatch the cam means from the work holder to permit of indexing of the latter.

2. In a milling machine, a bed, a plate on the forward portion of said bed and adjustable toward and from the rear of the bed, a work holder on said plate, a slide, means on the rear portion of the bed and mounting said slide for movement toward and from the work holder, a tool holder on said slide, a live center device, means mounting said device on said plate for adjustment toward and from the work holder and to support an end of a piece of work in the work holder, means for moving said slide forwardly and rearwardly to carry a tool supported by said holder into and out of engagement with work in said work holder, means for indexing the work holder in predetermined timed relation with movements of the slide, means for imparting a turning movement to the work holder and thus the work while a tool is moving forwardly in engagement with the work whereby to have the tool cut a spiral flute in the work, and said means adapted for rotating said tool in a direction whereby its cutting thrust is from the work holder toward said live center device.

3. In a milling machine, a bed, a work holder on said bed, a slide, means on the bed and mounting said slide for movement toward and from the work holder, a tool holder on the slide, a live center device, means mounting said device on said bed, to support an end of a piece of work in the work holder, means for moving said slide forwardly and rearwardly to carry a tool supported by said holder into and out of engagement with work in said work holder, means for indexing the work holder in timed relation with movements of the slide, means for imparting a turning movement to the work holder and thus the work while a tool is moving forwardly in engagement with the work to have the tool cut a spiral flute in the work, and said means adapted for rotating said tool in a direction whereby its cutting thrust is toward said live center device.

4. In a milling machine, a work holder, a slide movable toward and from the work holder, a tool holder on said slide and movable vertically thereon, means for moving said slide to carry a tool in the tool holder toward and from work in the work holder, means for raising and lowering the tool holder on the slide to raise the tool from the work at the end of a cut and to lower the tool holder when the slide has moved to carry the tool from the work, a guide on said machine, and a bracket secured to said tool holder and including a leg vertically movable in said guide to assist in maintaining said tool holder aligned during its vertical movement.

5. In a milling machine, a bed, a support on said bed, a work holder on said bed, a slide mounted by said support and movable thereon forwardly and rearwardly toward and from the work holder, a tool holder on the forward end of said slide, means for moving the slide, said work holder including a chuck, means for indexing said chuck between forward movements of said slide, a locking means movable with said chuck, means movable relative to said chuck and having a spiral cam groove therein, a latch adapted to secure said movable means to said locking means during forward movements of the slide, and means movable with said slide and operating in said cam groove to impart turning movement to said movable means and thereby said chuck during forward movement of the slide while the tool holder is engaging a tool with work held by the chuck to have the tool make a spiral cut in the work.

6. The machine as in claim 5 including means for releasing said latch from said locking means after the slide has completed its forward movement.

7. In a milling machine, a bed, a support on said bed, a work holder on said bed, a slide mounted on said support and movable thereon forwardly and rearwardly toward and from said work holder, a tool holder on the forward end of said slide, means for moving the slide, said work holder including a chuck, means for indexing said chuck between forward movements of said slide, a reciprocable means at one side of the work holder and connected to and movable forwardly and rearwardly with said slide, a movable means on said work holder, latch means connecting said movable means rigid with the chuck during forward movements of the slide, and cam means between said reciprocable means and said movable means whereby the latter is turned and turns the chuck during forward movements of the slide while the tool holder is engaging a tool with work held by the chuck to have the tool make a spiral cut in the work.

8. In a milling machine, a bed, a support on said bed, a work holder on said bed, a slide mounted on said support and movable thereon forwardly and rearwardly toward and from said work holder, a tool holder on the forward end of said slide, means for moving the slide, said work holder including a chuck, means for indexing said chuck between forward movements of said slide, a reciprocable means at one side of the work holder and connected to and movable forwardly and rearwardly with said slide, a movable means on said work holder, latch means connecting said movable means rigid with the chuck during forward movements of the slide, said movable means having a cam groove therein, and means rigid with said reciprocable means and disposed in said cam groove whereby said movable means is given a turning movement and turns the chuck during forward movements of the slide while the tool holder is engaging a tool with work held by the chuck to have the tool make a spiral cut in the work.

9. In a milling machine, a work holder, a slide movable horizontally toward and from the work holder, a cutter holder on said slide and vertically movable thereon, means for moving the slide to carry a cutter in the cutter holder horizontally toward and from work in the work holder, cam means for lowering the cutter holder on the slide to engage the cutter with the work and to raise the holder and withdraw the cutter from the work at the end of a cut, a guide on the cutter holder, changeable templates carried by the guide, and means controlled by said cam means and located between said templates whereby further vertical movement is imparted to the cutter holder in accordance with the shape of said templates as the slide is moved horizontally.

10. In a milling machine, a work holder, a slide movable horizontally toward and from the work holder, a cutter holder on said slide and vertically movable thereon, means for moving the slide to carry a cutter in the cutter holder horizontally toward and from work in the work holder, cam controlled means for imparting predetermined vertical movements to the cutter holder, a guide on the cutter holder, changeable templates carried by the guide, and means controlled by said cam controlled means and located between said templates whereby further vertical movements are imparted to the cutter holder in accordance with the shape of said templates as the slide is moved horizontally.

11. In a milling machine, a work holder, a slide, means mounting said slide for horizontal movements toward and from said work holder, a cutter holder, means mounting said cutter holder on said slide for vertical movements relative thereto, means for moving said slide forwardly and rearwardly to have the cutter holder move a cutter into engagement with work on said holder and to withdraw the cutter from the work, a guide on said cutter holder, changeable templates in said guide, means disposed between said templates, and means for maintaining the last mentioned means against vertical movement whereby it operates against said templates as the slide is moved forwardly and rearwardly to impart vertical movements to the cutter holder as determined by the shapes of said templates.

12. In a milling machine, a bed, a work holder on said bed, a slide, means mounting said slide on said bed for horizontal movements toward and from said work holder, a tool holder, means mounting said tool holder on said slide for vertical movements relative thereto, means for moving said slide forwardly and rearwardly to move the tool holder and engage a tool with work on said work holder and to withdraw the tool from the work, means for raising the tool holder to take the tool out of a cut and to thereafter lower the tool holder when it has moved rearwardly from the work, said work holder including a chuck, means for indexing said chuck between forward movements of said slide, a reciprocable means at one side of the work holder and connected to and movable forwardly and rearwardly with said slide, a movable means on said work holder, latch means connecting said movable means rigid with the chuck during forward movements of the slide, and cam means between said reciprocable means and said movable means whereby the latter is turned and turns the chuck during forward movements of the slide while the tool holder is engaging a tool with work held by the chuck to have the tool make a spiral cut in the work.

13. In a milling machine, a bed, a work holder on said bed, a slide, means mounting said slide on said bed for horizontal movements toward and from said work holder, a tool holder, means mounting said tool holder on said slide for vertical movements relative thereto, means for moving said slide forwardly and rearwardly to move the tool holder and engage a tool with work on said work holder and to withdraw the tool from the work, means for raising the tool holder to take the tool out of a cut and to thereafter lower the tool holder when it has moved rearwardly from the work, said work holder including a chuck, means for indexing said chuck between forward movements of said slide, a reciprocable means at one side of the work holder and connected to and movable forwardly and rearwardly with said slide, a movable means on said work holder, latch means connecting said movable means rigid with the chuck during forward movements of the slide, said movable means having a cam groove therein, and means rigid with said reciprocable means and disposed in said cam groove whereby said movable means is given a turning movement and turns the chuck during forward movement of the slide while the tool holder is engaging a tool with work held by the chuck to have the tool make a spiral cut in the work.

14. In a milling machine, a bed, a work holder on said bed, a slide, means mounting said slide on said bed for horizontal movements toward and from said work holder, a tool holder, means mounting said tool holder on said slide for vertical movements relative thereto, means for moving said slide forwardly and rearwardly to move the tool holder and engage a tool with work on said work holder and to withdraw the tool from the work, means for raising the tool holder to take the tool out of a cut and to thereafter lower the tool holder when it has moved rearwardly from the work, said work holder including a chuck means for indexing said chuck between forward movements of said slide, a reciprocal part at one side of the work holder and connected to and movable forwardly and rearwardly with said slide, a movable part on said work holder, latching means connecting said movable part rigid with the chuck during forward movements of the slide, one of said parts having a cam groove therein, and means rigid with the other of said parts and disposed in cam groove whereby the movable part is given a turning movement and turns the chuck during forward movement of the slide while the tool holder is engaging a tool with work held by the chuck to have the tool make a spiral cut in the work.

NEWMAN M. MARSILIUS.